(12) United States Patent
Nguyen

(10) Patent No.: US 12,429,688 B2
(45) Date of Patent: Sep. 30, 2025

(54) PROTECTIVE MEMBER FOR INFRARED IMAGING SYSTEM WITH DETACHABLE OPTICAL ASSEMBLY

(71) Applicant: Teledyne FLIR Commercial Systems, Inc., Goleta, CA (US)

(72) Inventor: Vu L. Nguyen, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 568 days.

(21) Appl. No.: 17/636,836

(22) PCT Filed: Aug. 28, 2020

(86) PCT No.: PCT/US2020/048585
§ 371 (c)(1),
(2) Date: Feb. 18, 2022

(87) PCT Pub. No.: WO2021/041944
PCT Pub. Date: Mar. 4, 2021

(65) Prior Publication Data
US 2022/0276486 A1 Sep. 1, 2022

Related U.S. Application Data

(60) Provisional application No. 62/894,569, filed on Aug. 30, 2019.

(51) Int. Cl.
*G02B 27/00* (2006.01)
*H04N 23/52* (2023.01)
*H04N 23/55* (2023.01)

(52) U.S. Cl.
CPC ......... *G02B 27/0006* (2013.01); *H04N 23/52* (2023.01); *H04N 23/55* (2023.01)

(58) Field of Classification Search
CPC ..... G02B 27/0006; H04N 23/52; H04N 23/55
See application file for complete search history.

(56) References Cited

U.S. PATENT DOCUMENTS

2002/0162963 A1 11/2002 Lannestedt et al.
2002/0181957 A1* 12/2002 Iida .................. G03B 17/04
396/448

(Continued)

FOREIGN PATENT DOCUMENTS

WO WO 2018/140820 A1 8/2018

OTHER PUBLICATIONS

Tissot et al., "Uncooled Microbolometer Detector: Recent Developments at ULIS", Opto-Electronics Review, Jan. 2, 2006, pp. 25-32, vol. 14, No. 1, Versita, Veurey-Voroize, France.

*Primary Examiner* — Ricky L Mack
*Assistant Examiner* — K Muhammad
(74) *Attorney, Agent, or Firm* — Haynes and Boone, LLP

(57) ABSTRACT

Various techniques are provided for protecting an infrared imager of a wafer level package. In one example, a method includes maintaining a protective member in a first position blocking an aperture of a wafer level package of an imaging system to protect an infrared imager disposed within the wafer level package. The method also includes attaching an optical assembly to the imaging system. The method also includes translating the protective member from the first position to a second position in response to a first force applied by the optical assembly against the imaging system during the attaching. The protective member is displaced from the aperture in the second position to expose the aperture to the optical assembly. Additional methods and systems are also provided.

20 Claims, 9 Drawing Sheets

(56) References Cited

U.S. PATENT DOCUMENTS

| | | | |
|---|---|---|---|
| 2004/0062545 A1* | 4/2004 | Ushiro | H04N 23/663 |
| | | | 396/529 |
| 2007/0211164 A1* | 9/2007 | Olsen | H04N 23/11 |
| | | | 348/E5.042 |
| 2008/0002968 A1 | 1/2008 | Arai | |
| 2015/0319378 A1 | 11/2015 | Hoelter et al. | |
| 2016/0350445 A1* | 12/2016 | Dowski, Jr. | H04N 23/57 |
| 2017/0339321 A1* | 11/2017 | Leonelli, Jr. | H04N 7/183 |

* cited by examiner

PROTECTIVE MEMBER FOR INFRARED IMAGING SYSTEM WITH DETACHABLE OPTICAL ASSEMBLY

CROSS-REFERENCE TO RELATED APPLICATIONS

This patent application is a U.S. National Stage Patent Application under 35 U.S.C. 371 of International Patent Application No. PCT/US2020/048585 filed Aug. 28, 2020 and entitled "PROTECTIVE MEMBER FOR INFRARED IMAGING SYSTEM WITH DETACHABLE OPTIC ASSEMBLY," which claims priority to and benefit of U.S. Provisional Patent Application No. 62/894,569 filed Aug. 30, 2019 and entitled "PROTECTIVE MEMBER FOR INFRARED IMAGING SYSTEM WITH DETACHABLE OPTICAL ASSEMBLY," which are hereby incorporated by reference in their entirety.

TECHNICAL FIELD

The present invention relates generally to infrared imaging and, more particularly, to infrared imaging systems with detachable optical assemblies.

BACKGROUND

In the field of infrared imaging, certain infrared imagers may be implemented with wafer level packages. In such devices, an array of highly sensitive infrared sensors (e.g., detectors) may be provided in a sealed package to protect them from contamination by dust particles, fingerprints, and/or other sources.

In order to reduce contamination, such infrared imagers may be assembled in a factory clean room and sealed with fixed optical components (e.g., a transmissive windows, lenses, filters, and/or other components). This sealed implementation permits infrared radiation to pass from the outside environment through the optical components and into the wafer level package where the infrared radiation is received by the infrared sensors that remain sealed from contamination by the outside environment.

Unfortunately, due to the fixed nature of the optical components, such infrared imagers may not be easily used with other optical components, such as different lenses or filters. Indeed, attempting to change the optical components may result in unwanted contamination of the infrared sensors and/or other components of the wafer level package, thus rendering the infrared imaging system unusable.

Although additional optical components may be added to the front of the existing fixed optical components in some cases, such implementations nevertheless attenuate the infrared radiation ultimately received by the infrared sensors, thus reducing the performance of the infrared imaging system. In addition, such implementations may significantly increase the size of the infrared imaging system in a manner that is inconvenient for practical use.

SUMMARY

Various techniques are disclosed to provide a movable protective member (e.g., a protective paddle, a protective curtain, and/or other appropriate structure) that is configured to selectively cover an aperture of an infrared imaging system to protect an infrared imager disposed in a wafer level package. For example, the protective member may translate between closed and open positions as an optical assembly is attached and detached from the infrared imaging system.

In one embodiment, a method includes maintaining a protective member in a first position blocking an aperture of a wafer level package of an imaging system to protect an infrared imager disposed within the wafer level package; attaching an optical assembly to the imaging system; translating the protective member from the first position to a second position in response to a first force applied by the optical assembly against the imaging system during the attaching; and wherein the protective member is displaced from the aperture in the second position to expose the aperture to the optical assembly.

In another embodiment, a system includes a wafer level package comprising an infrared imager disposed therein and an aperture configured to pass infrared radiation to the infrared imager; a protective member configured to be selectively positioned to block the aperture to protect the infrared imager; an optical assembly; wherein the protective member is configured to translate from a first position blocking the aperture to a second position in response to a first force applied by the optical assembly against the imaging system during an attachment of the optical assembly to the system; and wherein the protective member is displaced from the aperture in the second position to expose the aperture to the optical assembly.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with various embodiments disclosed herein, a movable protective member (e.g., a protective paddle, a protective curtain, and/or other appropriate structure) is configured to selectively cover (e.g., block) an aperture of an imaging system to protect an infrared imager disposed in a wafer level package (e.g., also referred to as a wafer scale package). In some embodiments, the protective member and/or another portion of the imaging system is configured to engage with a bearing surface of an optical assembly to selectively move from a closed position to an open position as the optical assembly is attached to the imaging system. The protective member may also be maintained in the closed position by a bias member when the optical assembly is detached, thus protecting the infrared imager from contamination. The protective member may also be selectively moved from the open position to the closed position as further discussed herein.

As a result, highly sensitive features of the wafer level package such as an infrared imager may be protected before, during, and after the optical assembly is attached and detached from the imaging system. Thus, in such embodiments, interchangeable optical assemblies can quickly and safely be switched in the field without contamination in order to perform different applications and measurements (e.g., different fields of view, different lenses and/or filters for detecting different gases or other phenomena, and/or other operations).

Such implementations may also reduce costs associated with wafer level package-based imaging systems. For example, the protective member may be used in place of a fixed optical components associated with conventional imaging systems. In addition, by implementing an infrared imager in a wafer level package, the higher costs of conventional in-situ packages can be avoided.

A protective member as disclosed herein may be more robust than a conventional shutter used in infrared imaging systems. In this regard, conventional temperature controlled shutters used for flat field correction are typically delicate structures with specialized coatings and are subject to contamination from dust particles, fingerprints, and/or other sources. Moreover, as discussed herein, the protective member may be translated in response to an optical assembly attachment process that may be manually performed by a user in some embodiments, whereas conventional temperature controlled shutters generally require electrical power to operate. In such cases, the protective member may be operated even while power to the imaging system is off (e.g., which can typically be the case when optical assemblies are attached and detached).

Figure 1A:
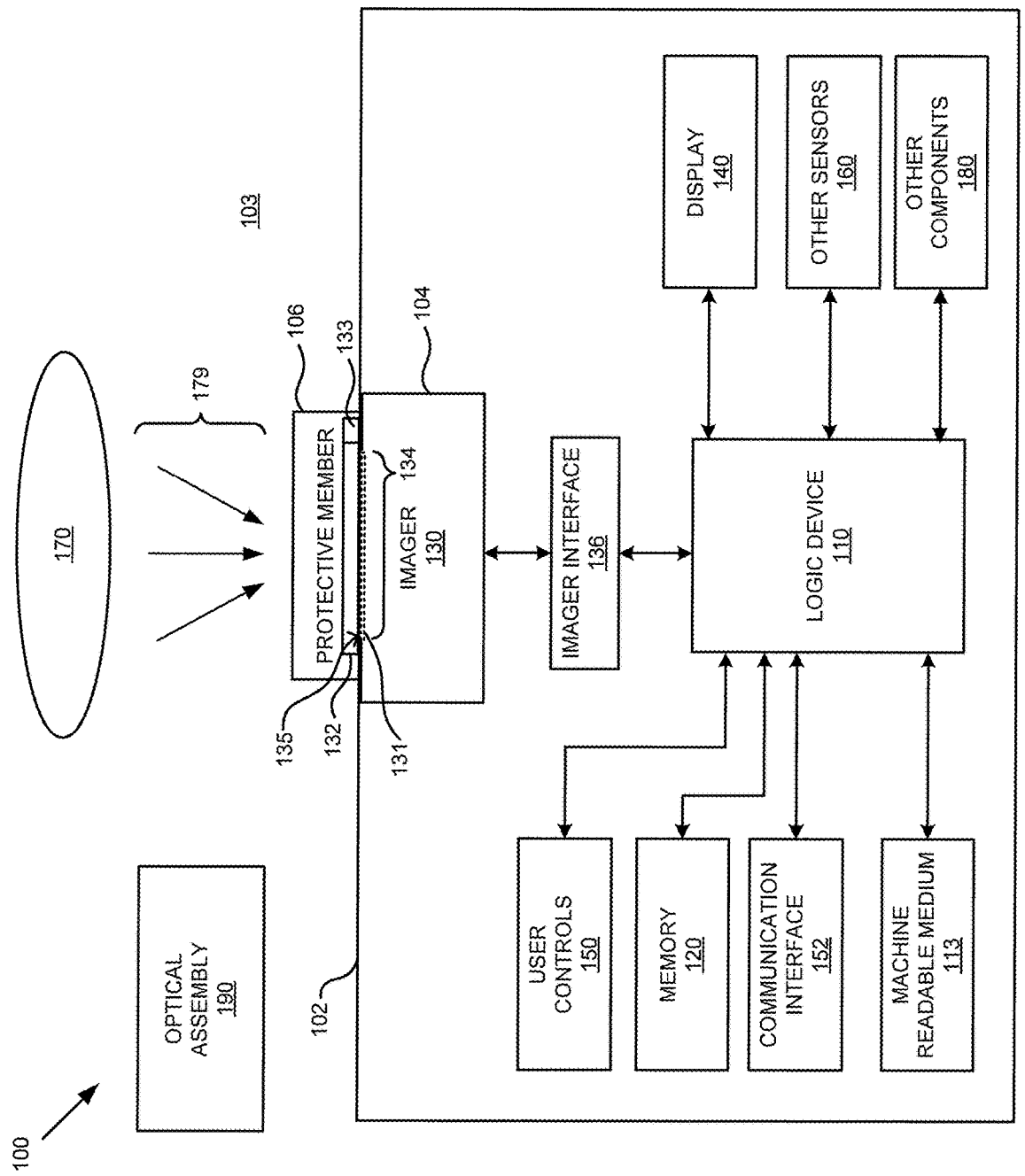
FIG. 1A illustrates a block diagram of an imaging system with a protective member in a closed position in accordance with an embodiment of the disclosure.
Figure 1B:
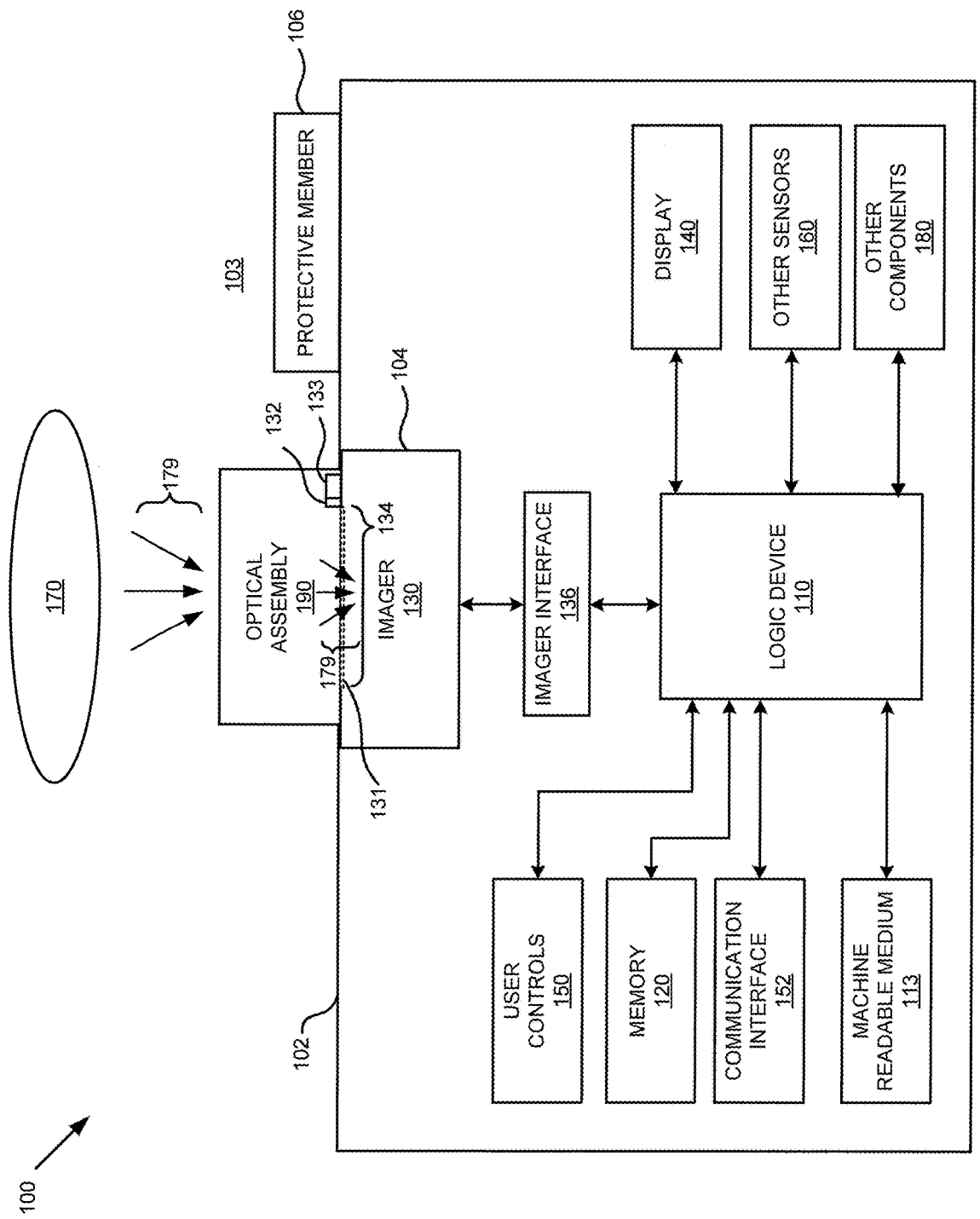
FIG. 1B illustrates a block diagram of an imaging system with a protective member in an open position in accordance with an embodiment of the disclosure.

Turning now to the drawings, FIG. 1A illustrates a block diagram of an imaging system 100 with a protective member 106 in a closed position and FIG. 1B illustrates a block diagram of imaging system 100 with protective member 106 in an open position, in accordance with embodiments of the disclosure.

As shown, imaging system 100 includes an optical assembly 190, a protective member 106, a housing 102 (e.g., a camera body), a wafer level package 104, an imager interface 136, a logic device 110, a machine-readable medium 113, a memory 120, a display 140, user controls 150, a communication interface 152, other sensors 160, and other components 180. In various embodiments, imaging system 100 may be implemented, for example, as a camera system such as a portable handheld camera system, a small form factor camera system implemented as part of another device, a fixed camera system, and/or other appropriate implementations.

Wafer level package 104 (e.g., a vacuum package assembly implemented as an anti-reflective coated protective package) providing a chamber that encloses an imager 130 disposed therein that may be used to capture image frames (e.g., images) of a scene 170 (e.g., a field of view). In various embodiments, imager 130 may be implemented as an infrared imager (e.g., a thermal imager), a visible light imager, and/or other types of imagers as appropriate.

As shown, wafer level package 104 includes an aperture 134 through which infrared radiation 179 may pass to be captured by imager 130 (e.g., when aperture is not blocked by protective member 106 or shutter 132 as shown in FIG. 1B). For example, wafer level package 104 may include a transmissive window 131 that permits infrared radiation 179 to pass while still sealing the interior of wafer level package 104. However, because protective member 106 and optical assembly 190 provide substantial additional protection for wafer level package 104 from environment 103, window 131 may be implemented with reduced materials such as only those materials necessary to seal the interior of wafer level package 104. As a result, wafer level package 104 may be implemented with reduced weight, reduced complexity, and reduced cost.

Moreover, the protection afforded by protective member 106 and optical assembly 190 also permits shutter 132 to be implemented with similarly reduced materials as shutter 132 is not required to protect wafer level package 104 but rather may be used for limited calibration purposes. As a result, shutter 132 may be similarly implemented with reduced weight, reduced complexity, and reduced cost.

Optical assembly 190 may be selectively attached to and detached from imaging system 100. In various embodiments, optical assembly 130 may include one or more optical elements (e.g., one or more lenses, filters, transmissive windows, and/or other optical components) that receive infrared radiation 179 from scene 170.

Protective member 106 may be mechanically coupled to imaging system 100 and selectively positioned in front of an aperture 134 of wafer level package 104 to block infrared radiation 179 and seal aperture 134 from an external environment 103 (e.g., in addition to the sealing provided by window 131 in some embodiments), thus protecting wafer level package 104 and imager 130 therein from contamination. In the illustrated embodiments, protective member 106 is implemented as a paddle, however other implementations are also contemplated as discussed herein.

In FIG. 1A, optical assembly 190 is shown detached from imaging system 100 and protective member 106 is in a closed position over aperture 134 to seal wafer level package 104 from environment 103. In FIG. 1B, optical assembly 190 is show attached to imaging system 100 and protective member 106 is in an open position displaced from aperture 134. In FIG. 1B, aperture 134 is exposed to optical assembly 190 but is still sealed from environment 103 through the attachment of optical assembly 190 to imaging system (e.g., in addition to the sealing provided by window 131 in some embodiments). When optical assembly 190 is attached to imaging system 100 as shown in FIG. 1B, optical assembly 190 passes infrared radiation 179 to aperture 134 in wafer level package 104 such that the infrared radiation 179 may be captured by imager 130 (e.g., when shutter 132 is open) to provide one or more infrared images. As further discussed herein, protective member 106 may translate between the closed position of FIG. 1A and the open position of FIG. 1B in response to the attachment and detachment of optical assembly 190 to and from imaging system 100.

Imager 130 may include an array of sensors (e.g., any type of infrared, visible light, or other types of detectors) for capturing image frames of scene 170. In some embodiments, imager 130 may also include one or more analog-to-digital converters for converting analog signals captured by the sensors into digital data (e.g., pixel values) to provide the captured image frames. Imager interface 136 provides the captured image frames to logic device 110 which may be used to process the image frames, store the original and/or processed image frames in memory 120, and/or retrieve stored image frames from memory 120.

In some embodiments, imaging system 100 may further include a shutter 132 that may be selectively positioned in front of aperture 134 of wafer level package 104 (e.g., in response to an actuator 133 controlled by logic device 110) to block infrared radiation 179 from being received by imager 130. For example, shutter 132 may be positioned to block imager 130 such that imager 130 may capture image frames of shutter 132 for calibration purposes (e.g., as shown in FIG. 1A). In this regard, in some embodiments, shutter 132 may provide a temperature controlled black body surface 135 facing imager 130 that is captured in one or more image frames by imager 130 to determine correction values for rows, columns, and/or individual pixels associated with the sensors of imager 130. Shutter 132 is shown open in FIG. 1B to permit infrared radiation 179 to pass to imager 130.

Logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 110 is configured to interface and communicate with the various components of imaging system 100 to perform various method and processing steps described herein. In various embodiments, processing instructions may be integrated in software and/or hardware as part of logic device 110, or code (e.g., software and/or configuration data) which may be stored in memory 120 and/or a machine readable medium 113. In various embodiments, the instructions stored in memory 120 and/or machine-readable medium 113 permit logic device 110 to perform the various operations discussed herein and/or control various components of system 100 for such operations.

Memory 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 113 (e.g., a memory, a hard drive, a compact disk, a digital video disk, or a flash memory) may be a non-transitory machine-readable medium storing instructions for execution by logic device 110. In various embodiments, machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information).

Logic device 110 may be configured to process captured image frames and provide them to display 140 for viewing by a user. Display 140 may include a display device such as a liquid crystal display (LCD), an organic light-emitting diode (OLED) display, and/or other types of displays as appropriate to display image frames and/or information to a user of system 100. Logic device 110 may be configured to display image frames and information on display 140. For example, logic device 110 may be configured to retrieve image frames and information from memory 120 and provide image frames and information to display 140 for presentation to a user of system 100. Display 140 may include display electronics, which may be utilized by logic device 110 to display such image frames and information.

User controls 150 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 150 may be integrated with display 140 as a touchscreen to operate as both user controls 150 and display 140. Logic device 110 may be configured to sense control input signals from user controls 150 and respond to sensed control input signals received therefrom. In some embodiments, portions of display 140 and/or user controls 150 may be implemented by appropriate portions of a tablet, a laptop computer, a desktop computer, and/or other types of devices.

In various embodiments, user controls 150 may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

Imaging system 100 may include various types of other sensors 160 including, for example, motion sensors (e.g., accelerometers, vibration sensors, gyroscopes and/or others), microphones, navigation sensors (e.g., global positioning system (GPS) sensors), and/or other sensors as appropriate.

Logic device 110 may be configured to receive and pass image frames from imager interface 136, additional data from sensors 160, and control signal information from user controls 150 to one or more external devices through communication interface 152 (e.g., through wired and/or wireless communications). In this regard, communication interface 152 may be implemented to provide wired communication over a cable and/or wireless communication over an antenna. For example, communication interface 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 152 may include an antenna coupled thereto for wireless communication purposes. In other embodiments, the communication interface 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 180 such as speakers, displays, visual indicators (e.g., recording indicators), vibration actuators, a battery or other power supply (e.g., rechargeable or otherwise), and/or additional components as appropriate for particular implementations.

Although various features of imaging system 100 are illustrated together in FIGS. 1A and 1B, any of the various illustrated components and subcomponents may be implemented in a distributed manner and used remotely from each other as appropriate.

Figure 2:
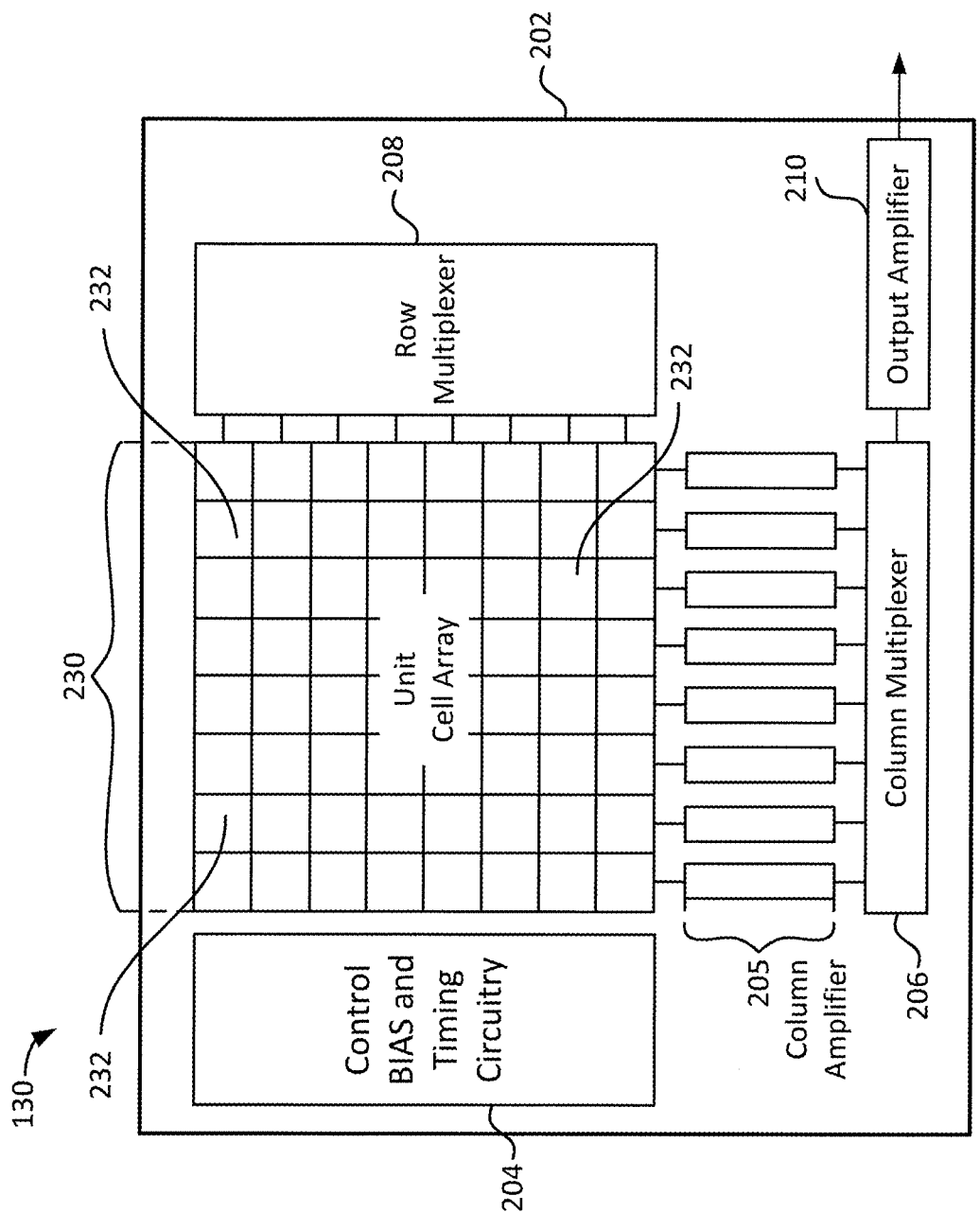
FIG. 2 illustrates a block diagram of an imager in accordance with an embodiment of the disclosure.
Figure 3B:
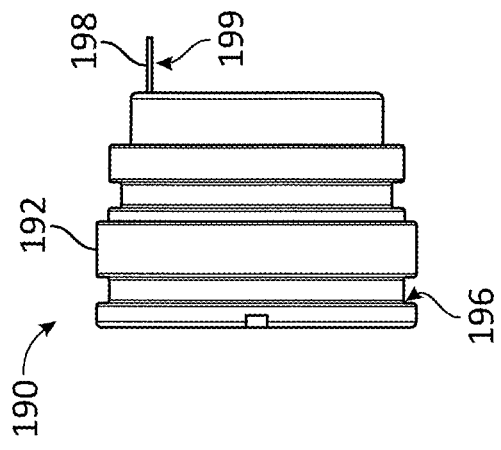
FIGS. 3A to 3D illustrate various views of an optical assembly in accordance with embodiments of the disclosure.
Figure 3D:
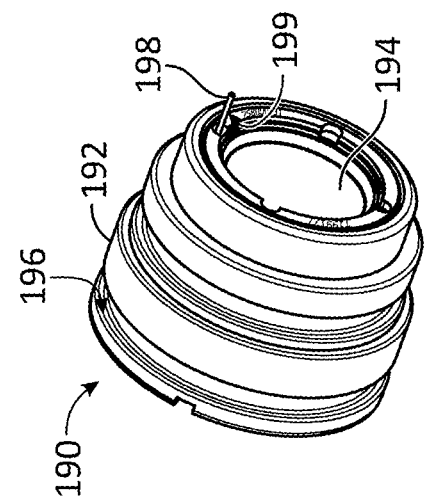
Figure 3A:
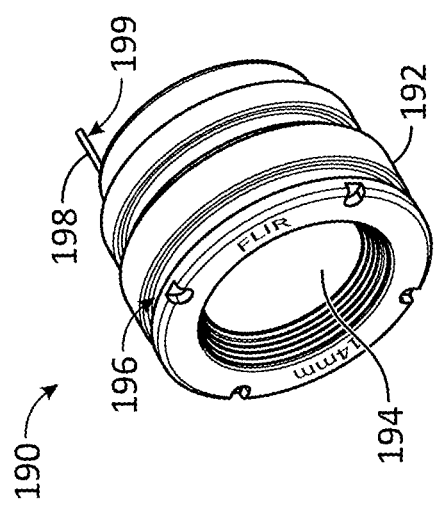
Figure 3C:
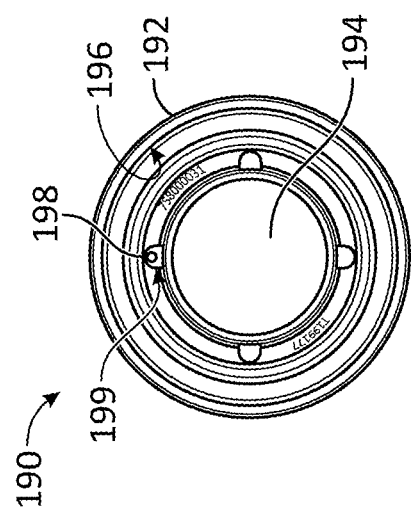

FIG. 2 illustrates a block diagram of imager 130 in accordance with an embodiment of the disclosure. In this illustrated embodiment, imager 130 is a focal plane array (FPA) including a sensor array 230 of infrared sensors 232 (e.g., implemented as unit cells) and a read out integrated circuit (ROIC) 202. Although an 8 by 8 array of infrared sensors 232 is shown, this is merely for purposes of example and ease of illustration. Any desired sensor array size may be used as desired.

Each infrared sensor 232 may be implemented, for example, by an infrared detector such as a microbolometer and associated circuitry to provide image data (e.g., a data value associated with a captured voltage) for a pixel of a captured thermal image. In this regard, time-multiplexed electrical signals may be provided by the infrared sensors 232 to ROIC 202.

ROIC 202 includes bias generation and timing control circuitry 204, column amplifiers 205, a column multiplexer 206, a row multiplexer 208, and an output amplifier 210. Image frames captured by infrared sensors 232 may be provided by output amplifier 210 to processing component 110 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

FIGS. 3A to 3D illustrate various views of optical assembly 190 in accordance with embodiments of the disclosure. As shown, optical assembly 190 may include a housing 192, one or more optical components 194, attachment surfaces 196, and an engagement member 198.

Housing 192 provides an outer body to secure the various components of optical assembly 190 together. Optical components 194 may include one or more lenses, filters, and/or other components used to affect infrared radiation 179 before it is received by imager 130. Attachment surfaces 196 may be implemented as threads as shown and/or any other appropriate features used to secure optical assembly 190 to imaging system 100.

Engagement member 198 may be implemented as a pin (e.g., as shown), a slot, a cam, a flange, protrusion, and/or any other structure providing a bearing surface 199 to apply force from optical assembly against protective member 106.

Figure 4:
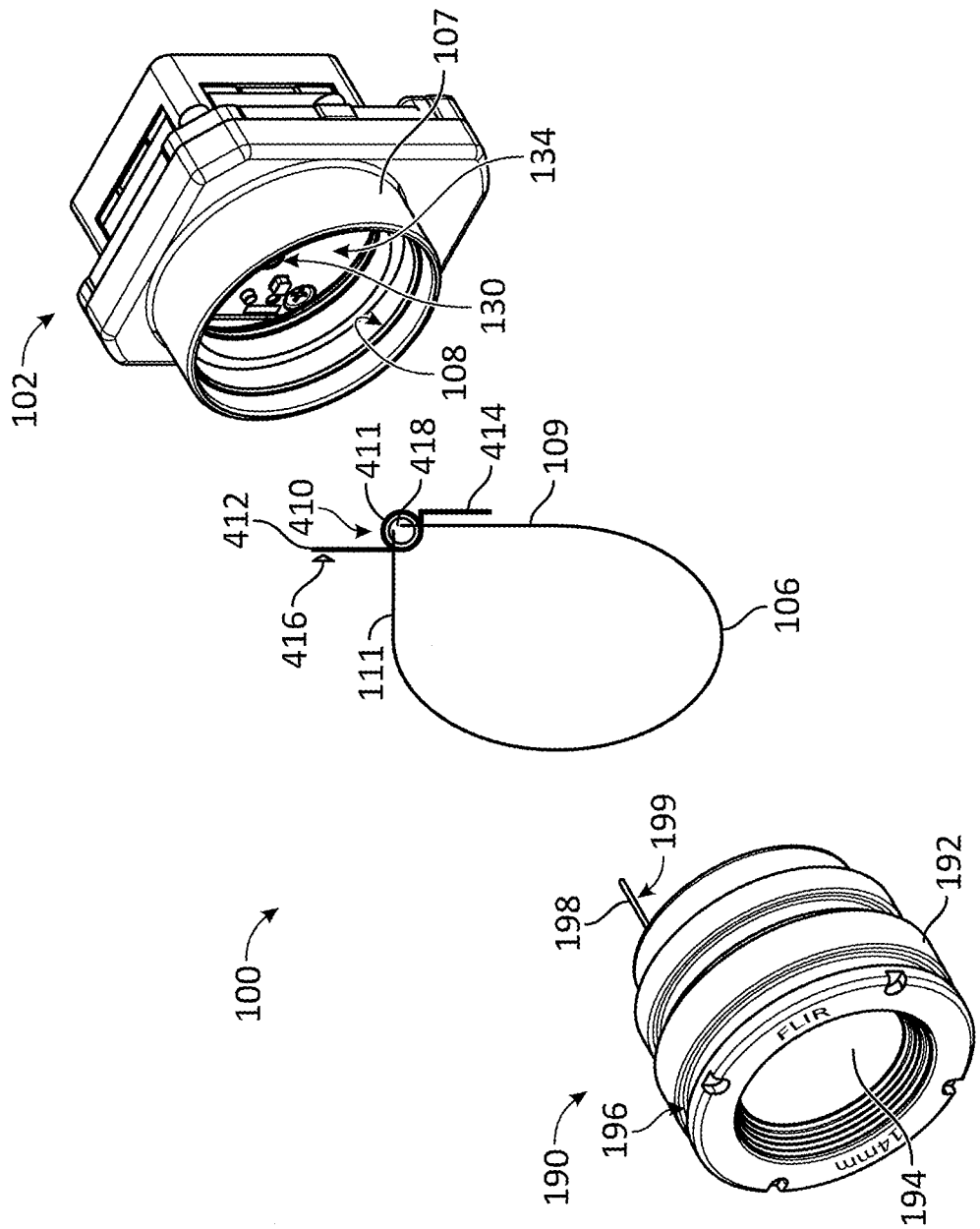
FIG. 4 illustrates an exploded view of an optical assembly, a protective member, and a camera body of an imaging system in accordance with an embodiment of the disclosure.

FIG. 4 illustrates an exploded view of optical assembly 190, protective member 106, and housing 102 of imaging system 100 in accordance with an embodiment of the disclosure. As shown, housing 102 includes a mount 107 configured to receive optical assembly 190 for attachment thereto. For example, mount 107 may include attachment surfaces 108 (e.g., threads as shown and/or other appropriate features) configured to receive attachment surfaces 196 of optical assembly 190 in a complementary fashion.

Aperture 134 and imager 130 are also visible in FIG. 4 while both optical assembly 190 and protective member 106 are shown in exploded form (e.g., both detached from housing 102 for ease of illustration). Window 131, shutter 132, and actuator 133 are not shown in FIG. 4 in order to better illustrate the other features discussed below.

As also shown, a bias member 410 is provided. In some embodiments, bias member 410 may be implemented as a torsion spring as shown, however other embodiments such as linear springs or other structures may also be used.

Bias member 410 includes an intermediate portion 411 and ends 412 and 414. Intermediate portion 411 may be disposed around a pivot member 418 (e.g., a pivot pin and/or other appropriate structure) secured to housing 102, end 412 may be in contact with an anchor 416 secured to housing 102, and end 414 may be in contact with an edge 109 of protective member 106 (e.g., in FIG. 4, pivot member 418 and anchor 416 are shown separately from housing 102 in FIG. 4 to further illustrate their features). In some embodiments, protective member 106 may be mechanically coupled to housing 102 by pivot member 418.

Figure 5:
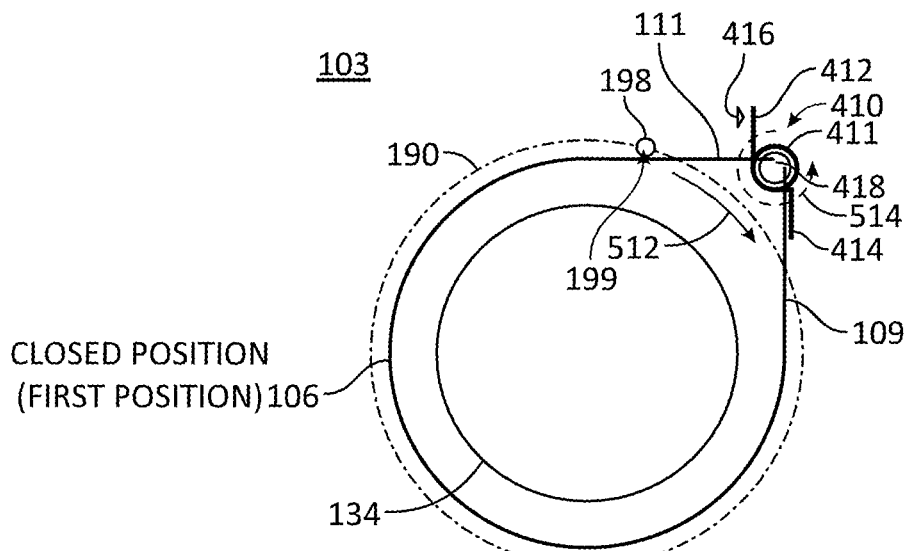
FIG. 5 illustrates a protective member in a closed position over an aperture of a wafer level package in accordance with an embodiment of the disclosure.
Figure 6:
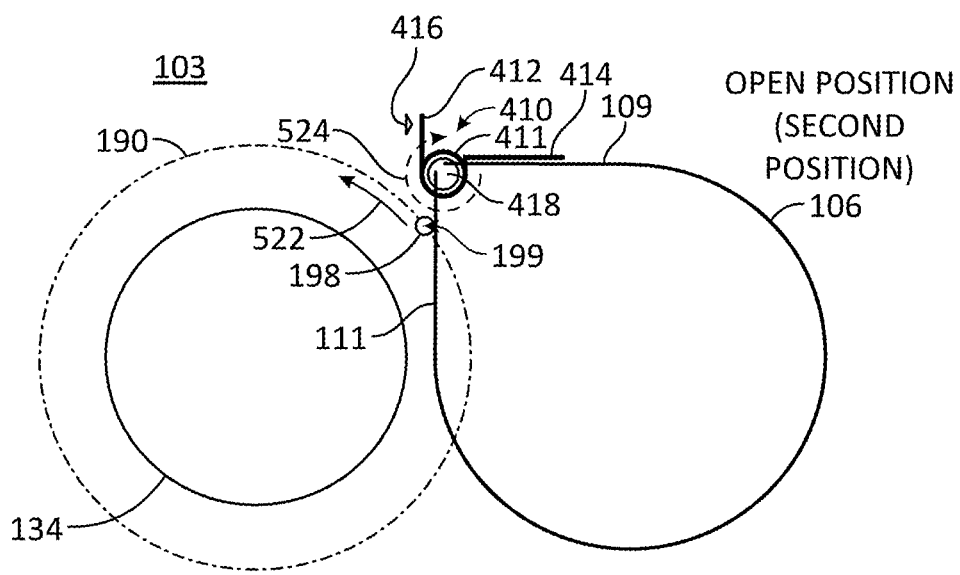
FIG. 6 illustrates a protective member in an open position displaced from an aperture of a wafer level package in accordance with an embodiment of the disclosure.
Figure 7:
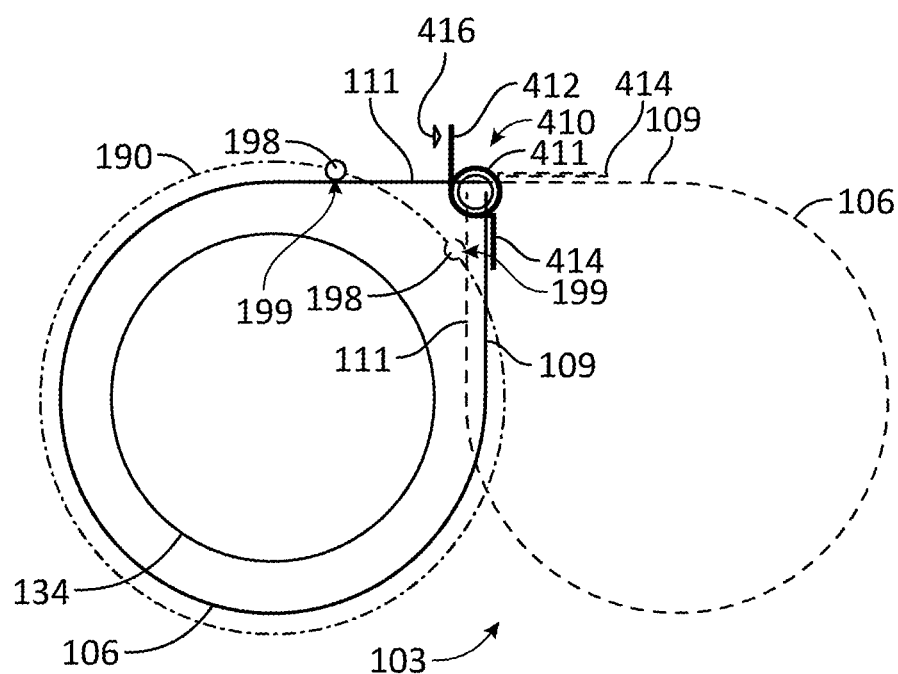
FIG. 7 illustrates a protective member in both closed and open positions in accordance with an embodiment of the disclosure.

FIG. 5 illustrates protective member 106 in a closed position over aperture 134, FIG. 6 illustrates protective member 106 in an open position displaced from aperture 134, and FIG. 7 illustrates protective member 106 in both closed and open positions, in accordance with embodiments of the disclosure. The operation of the various features shown in FIGS. 4 to 7 will be further understood with reference to the processes of FIGS. 8 and 9 as discussed herein.

Figure 8:
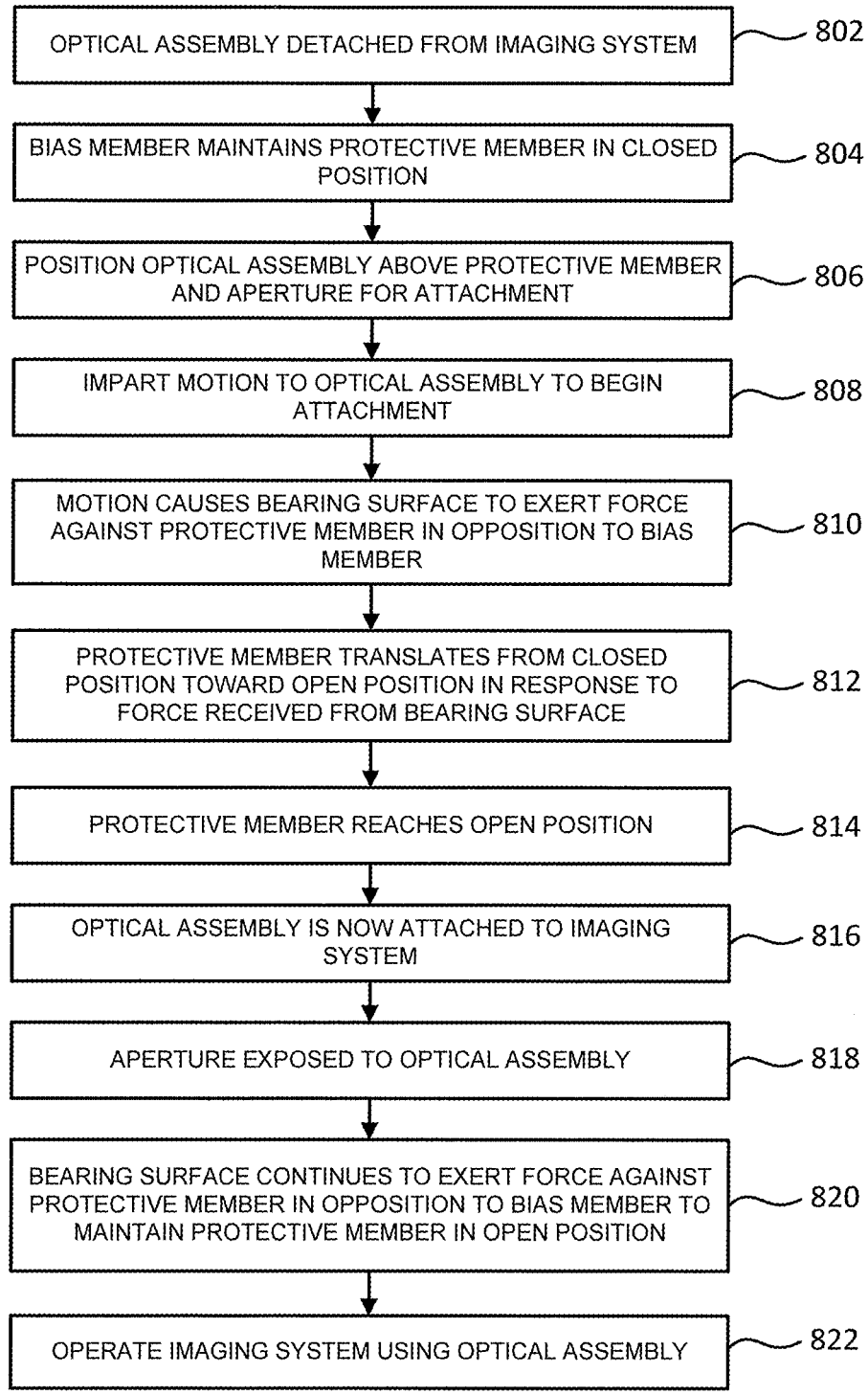
FIG. 8 illustrates a process of attaching an optical assembly to an imaging system in accordance with an embodiment of the disclosure.

FIG. 8 illustrates a process of attaching optical assembly 190 to imaging system 100 in accordance with an embodiment of the disclosure. In block 802, optical assembly 190 is initially in a detached state relative to imaging system 100 in the manner illustrated in FIG. 1A.

In block 804, bias member 410 maintains protective member 106 in a closed position (e.g., a first position) in the manner illustrated in FIG. 5. For example, as shown in FIG. 5, protective member 106 is wider than aperture 134 and covers (e.g., blocks) aperture 134 while in the closed position to seal the interior of wafer level package 104 from environment 103.

In this regard, ends 412 and 414 of bias member 410 are attached to anchor 416 of housing 102 and an edge 109 of protective member 106, respectively. Bias member 410 is preloaded in FIG. 5 and maintains tension through end 414 against edge 109 of protective member 106 to resist translation (e.g., pivoting) of protective member 106 in the direction of arrow 512.

In block 806, optical assembly 190 is positioned above protective member 106 and aperture 134. For example, optical assembly 190 may be positioned in proximity to mount 107. In various embodiments, a user and/or a machine may manipulate optical assembly 190 to perform the operation of block 806.

In block 808, motion is imparted to optical assembly 190 to begin attaching optical assembly 190 to housing 102. For example, in the embodiment illustrated in FIG. 5, a user and/or a machine may begin rotating optical assembly 190 clockwise in the direction of arrow 512 to begin engaging attachment surfaces 196 and 108 (e.g., threads) with each other. Other types of motion are also contemplated. For example, any appropriate type of rotational motion, linear motion, pressure, and/or other forces may be used in various embodiments.

In block 810, the motion of optical assembly 190 (e.g., begun in block 808) causes the bearing surface 199 provided by engagement member 198 to exert force against protective member 108 in opposition to the resistive force exerted by bias member 410. For example, as shown in FIG. 5, as optical assembly 190 is rotated clockwise in the direction of arrow 512, bearing surface 199 of engagement member 198 contacts edge 111 of protective member 108.

In block 812, protective member 108 translates (e.g., moves) in response to the force received from the engagement member 198 through bearing surface 199 against edge 111 when such force exceeds the resistive force exerted by bias member 410 against edge 109. In this regard, bias member 410 is caused to expand in the direction of arrow 514 and protective member 108 is caused to pivot about pivot member 418 in the direction of arrow 514 from the closed position illustrated in FIG. 5 to the open position (e.g., a second position) illustrated in FIG. 6.

Significantly, during the translation of block 812, optical assembly 190 is positioned over aperture 134. In this regard, aperture 134 remains substantially or completely sealed from environment 103 even while protective member 106 is no longer fully covering over aperture 134. As a result, the interior of wafer level package 104 including imager 130 remains safe from unwanted contamination.

In block 814, protective member 108 completes its translation to the open position illustrated in FIG. 6. In block 816, optical assembly 190 is fully attached to housing 102. In various embodiments, blocks 814 and 816 may be performed in any order or simultaneously (e.g., protective member 108 may reach the open position before, after, or simultaneously with the full attachment of optical assembly 190 to housing 102).

Following blocks 814 and 816, optical assembly 190 covers aperture 134 to seal the interior of wafer level package 104 from environment 103. Accordingly, in block 818, aperture 134 is exposed to optical assembly 190 as shown in FIG. 1B, but remains sealed from environment 103 by the attachment of optical assembly 190 to housing 102, thus also sealing imager 130 from environment 103.

In block 820, the bearing surface 199 provided by engagement member 198 continues to exert force against edge 111 of protective member 106 greater than the force exerted by bias member 410 against edge 109 of protective member 106 (e.g., bias member 410 is fully loaded as shown in FIG. 6). As a result, protective member 108 remains fixed in the open position while optical assembly 190 remains attached to housing 102.

In block 822, imaging system 100 is operated with optical assembly 190 in place. Accordingly, infrared radiation 179 may pass through optical assembly 190 and aperture 134 to be captured by imager 130 as shown in FIG. 1B. Also, in some embodiments, shutter 132 may be selectively opened before or during the process of FIG. 8 to permit infrared radiation 179 to pass through to imager 130.

Figure 9:
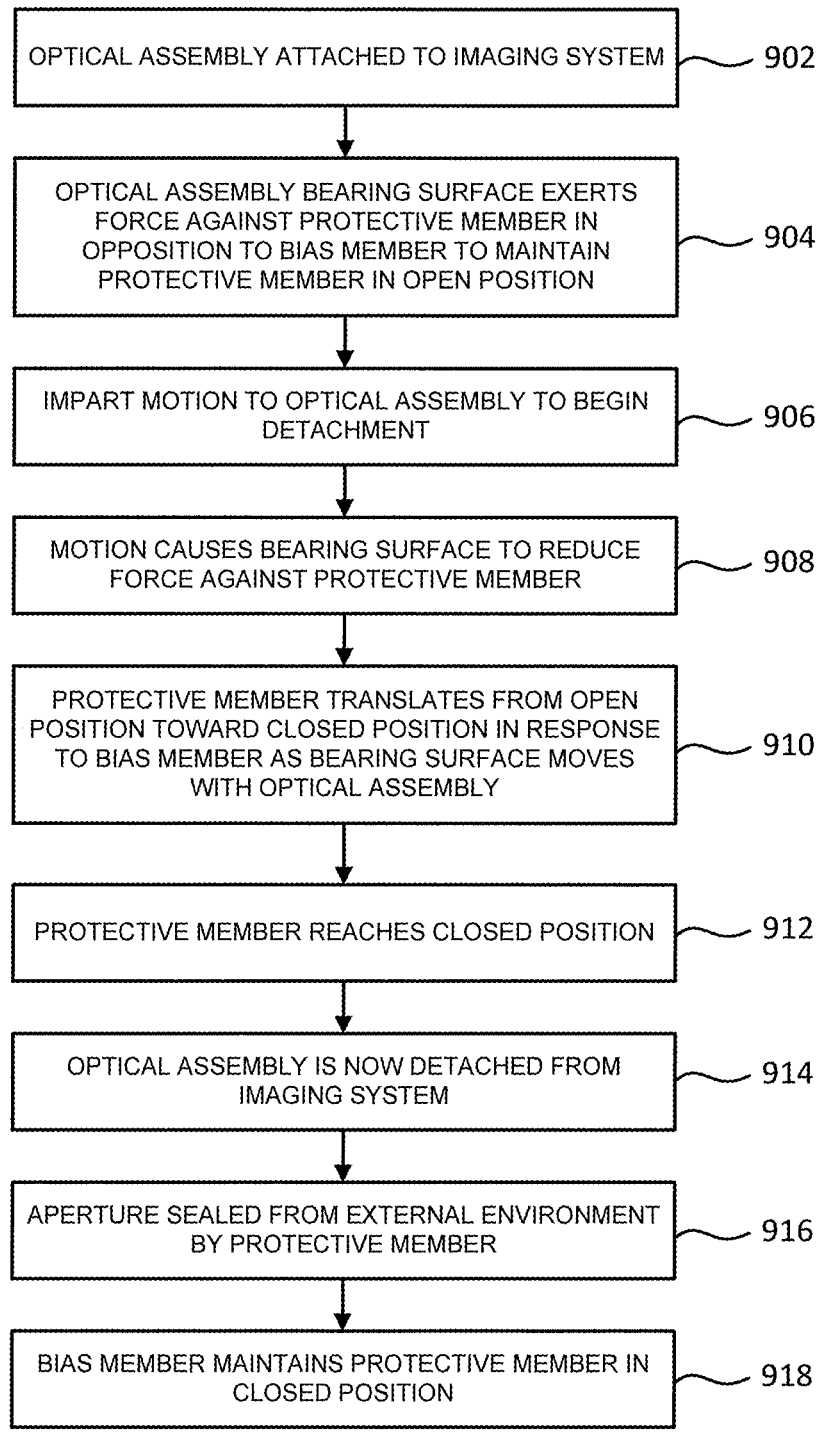
FIG. 9 illustrates a process of detaching an optical assembly from an imaging system in accordance with an embodiment of the disclosure.

FIG. 9 illustrates a process of detaching optical assembly 190 from imaging system 100 in accordance with an embodiment of the disclosure. In block 902, optical assembly 190 is initially in an attached state relative to imaging system 100 in the manner illustrated in FIG. 1B (e.g., following the process of FIG. 8 discussed herein).

In block 904, the bearing surface 199 provided by engagement member 198 exerts force against edge 111 of protective member 106 greater than the force exerted by bias member 410 against edge 109 of protective member to maintain protective member 108 in the open position.

In block 906, motion is imparted to optical assembly 190 to begin detaching optical assembly 190 from housing 102. For example, in the embodiment illustrated in FIG. 6, a user and/or a machine may begin rotating optical assembly 190 counterclockwise in the direction of arrow 522 to begin disengaging attachment surfaces 196 and 108 (e.g., threads) from each other. Other types of motion are also contemplated. For example, any appropriate type of rotational motion, linear motion, pressure, and/or other forces may be used in various embodiments.

In block 908, the motion of optical assembly 190 (e.g., begun in block 906) causes the bearing surface 199 provided by engagement member 198 to exert less force against protective member 108 than the opposing resistive force exerted by bias member 410.

As a result, in block 910, protective member 108 translates (e.g., moves) in response to the greater force received from bias member 410 against edge 109. In this regard, bias member 410 is caused to contract in the direction of arrow 524 and protective member 108 is caused to pivot about pivot member 418 in the direction of arrow 524 from the open position illustrated in FIG. 6 to the closed position illustrated in FIG. 5. For example, as shown in FIG. 6, as optical assembly 190 is rotated counterclockwise in the direction of arrow 522, engagement member 198 is drawn away from edge 198. Although the force exerted by bias member 410 will continue to push protective member 108 against engagement member 198 (e.g., thus causing the bearing surface 199 of engagement member to continue contacting edge 111), the greater force exerted by bias member 410 will cause protective member 106 to translate with engagement member 198 toward the closed position.

As similarly discussed with regard to block 812, during the translation of block 910, optical assembly 190 remains positioned over aperture 134. As a result, aperture 134 remains substantially or completely sealed from environment 103 even while protective member 106 is not yet fully covering over aperture 134. Accordingly, the interior of wafer level package 104 including imager 130 remains safe from unwanted contamination.

In block 912, protective member 108 completes its translation to the closed position illustrated in FIG. 5. In block 914, optical assembly 190 is fully detached from housing 102. In various embodiments, blocks 912 and 914 may be performed in any order or simultaneously (e.g., protective member 108 may reach the closed position before, after, or simultaneously with the full detachment of optical assembly 190 from housing 102).

Following blocks 912 and 914, protective member 108 covers aperture 134 to seal the interior of wafer level package 104 from environment 103 as shown in FIG. 1A (block 916). In block 918, bias member 410 maintains protective member 106 in the closed position in the manner illustrated in FIG. 5 as similarly discussed with regard to block 804 of FIG. 8. Following the process of FIG. 9, the process of FIG. 8 may be performed to attach the same or different optical assembly 190 as desired to support different uses of imaging system 100 as desired.

Additional embodiments are also contemplated. For example, although engagement member 198 and bias member 410 have been described as directly contacting edges 111 and 109 of protective member 106, respectively, other intermediate structures of imaging system 100 may also be used. For example, bearing surface 199 of engagement member 198 may contact one or more intermediate structures of imaging system 100 disposed between engagement member 198 and protective member 106 to cause protective member 106 to move. Similarly, end 414 of bias member 410 may contact one or more additional intermediate structures of imaging system 100 disposed between bias member 410 and protective member 106 to cause protective member 106 to move.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
    maintaining a protective member in a first position blocking an aperture of a wafer level package of an imaging system to protect an infrared imager disposed within the wafer level package, there being no optical assembly attached to the imaging system;
    positioning an optical assembly relative to the protective member and the aperture for attaching the optical assembly to the imaging system;
    attaching an optical assembly to the imaging system, wherein the attaching comprises imparting rotating motion to the optical assembly to attach the optical assembly to the imaging system;
        wherein the rotating motion of the optical assembly causes exertion of a first force against the protective member;
    pivoting the protective member from the first position to a second position in response to the first force applied during the attaching; and
    wherein the protective member is displaced from the aperture in the second position to expose the aperture to the optical assembly.

2. The method of claim 1, wherein the maintaining is performed by a bias member configured to resist the pivoting of the protective member from the first position to the second position; and
    wherein the first force opposes a bias provided by the bias member.

3. The method of claim 2, further comprising:
    detaching the optical assembly from the imaging system, wherein the detaching comprises imparting rotating motion to the optical assembly to detach the optical assembly from the imaging system; and
    pivoting the protective member from the second position to the first position in response to a second force applied by the bias member against the optical assembly during the detaching.

4. The method of claim 2, wherein the bias member is a torsion spring disposed about a pivot pin secured to a housing of the imaging system.

5. The method of claim 1, wherein the optical assembly comprises a bearing surface configured to engage with the protective member to apply the first force.

6. The method of claim 5, wherein the bearing surface is a pin, a slot, a cam, and/or a flange.

7. The method of claim 1, wherein the attaching comprises rotating the optical assembly to engage threads of the optical assembly with complementary threads of the imaging system.

8. The method of claim 1, wherein the pivoting comprises pivoting the protective member from the first position to the second position about a pivot member secured to a housing of the imaging system.

9. The method of claim 1, wherein the attaching is performed manually by a user of the imaging system.

10. The method of claim 1, wherein:
    the optical assembly is a lens and/or a filter; and
    the protective member is a paddle and/or a curtain.

11. A system comprising:
    a wafer level package of an imaging system comprising an infrared imager disposed within the wafer level package, the wafer level package comprising an aperture configured to pass infrared radiation to the infrared imager;
    a protective member configured to be selectively positioned to block the aperture to protect the infrared imager in the absence of an optical assembly attached to the imaging system;
    wherein the imaging system is attachable to an optical assembly by an attaching process comprising imparting rotating motion to the optical assembly to attach the optical assembly to the imaging system;
        wherein the rotating motion of the optical assembly causes exertion of a first force against the protective member;
    wherein the protective member is configured to pivot from a first position blocking the aperture to a second position in response to the first force applied during an attachment of the optical assembly to the imaging system; and
    wherein the protective member is displaced from the aperture in the second position to expose the aperture to the optical assembly.

12. The system of claim 11, further comprising a bias member configured to resist pivoting of the protective member from the first position to the second position.

13. The system of claim 12, wherein the protective member is configured to pivot from the second position to the first position in response to a second force applied by the bias member against the optical assembly during a detachment of the optical assembly from the imaging system.

14. The system of claim 12, wherein the bias member is a torsion spring disposed about a pivot member secured to a housing of the imaging system.

15. The system of claim 11, wherein the optical assembly comprises a bearing surface configured to engage with the protective member to apply the first force.

16. The system of claim 15, wherein the bearing surface is a pin, a slot, a cam, and/or a flange.

17. The system of claim 11, wherein the optical assembly is configured to rotate to engage threads of the optical assembly with complementary threads of the system to attach the optical assembly to the imaging system.

18. The system of claim 11, wherein the protective member is configured to pivot from the first position to the second position about a pivot pin secured to a housing of the imaging system.

19. The system of claim 11, wherein the attachment is performed manually by a user of the system.

20. The system of claim 11, wherein:
the optical assembly is a lens and/or a filter; and
the protective member is a paddle and/or a curtain.

* * * * *